United States Patent

[11] 3,626,839

| [72] | Inventors | John C. Martin;<br>Eugene G. Rescho, both of Springfield, Ill. |
|---|---|---|
| [21] | Appl. No. | 59,296 |
| [22] | Filed | July 29, 1970 |
| [45] | Patented | Dec. 14, 1971 |
| [73] | Assignee | Bunn-O-Matic Corporation<br>Springfield, Ill.<br>Continuation-in-part of application Ser. No. 3,013, Jan. 15, 1970, now Patent No. 3,593,650, dated July 20, 1971. This application July 29, 1970, Ser. No. 59,296 |

[54] HOT WATER SPRAY HEAD FOR COFFEE MAKING MACHINE
7 Claims, 4 Drawing Figs.

[52] U.S. Cl. .................................................. 99/315, 239/498
[51] Int. Cl. .................................................. A47j 31/00
[50] Field of Search .................................................. 99/312, 313, 314, 315, 295, 310; 239/498, 680

[56] References Cited
UNITED STATES PATENTS

| 2,882,811 | 4/1959 | Kass ............................ | 99/312 |
| 1,036,767 | 8/1912 | Wojidkow ................... | 99/312 |
| 1,183,721 | 5/1916 | Bowman ...................... | 99/312 |

Primary Examiner—Robert W. Jenkins
Attorney—Robert R. Lockwood

ABSTRACT: Hot water is distributed over ground coffee to make coffee extract by a frustoconical one piece plastic spray head having a serrated periphery with alternate serrations of different lengths. Channels formed by inverted V-shaped integral ribs direct the flow of the hot water to the tips of the serrations. Upstanding support pins from the flat upper surface are aligned with certain of the channels which are wider at the entrance than the other channels to compensate for the presences of the support pins.

HOT WATER SPRAY HEAD FOR COFFEE MAKING MACHINE

This application is a continuation-in-part of application Ser. No. 3,013, filed Jan. 15, 1970, now U.S. Patent No. 3,593,650 issued July 20, 1971.

Among the objects of this invention are: to provide for uniformly distributing hot water over ground coffee to make coffee extract; for this purpose to support a spray head to receive centrally thereof a downwardly flowing stream of hot water; to avoid a requirement that the coffee-making machine and particularly the spray head be accurately leveled to ensure uniform distribution of the hot water; to provide a frustoconical surface over which the hot water flows having a serrated periphery with alternate serrations of different lengths; to direct the flow of hot water to the tips of the serrations by channels in alignment therewith; to form the channels by inverted V-shaped ribs integral with the inclined surface of the spray head; and to support the spray head by pins extending upwardly from its flat top surface, the pins being in alignment with certain of the channels which are wider at the entrance than the remaining channels.

Figure 1:
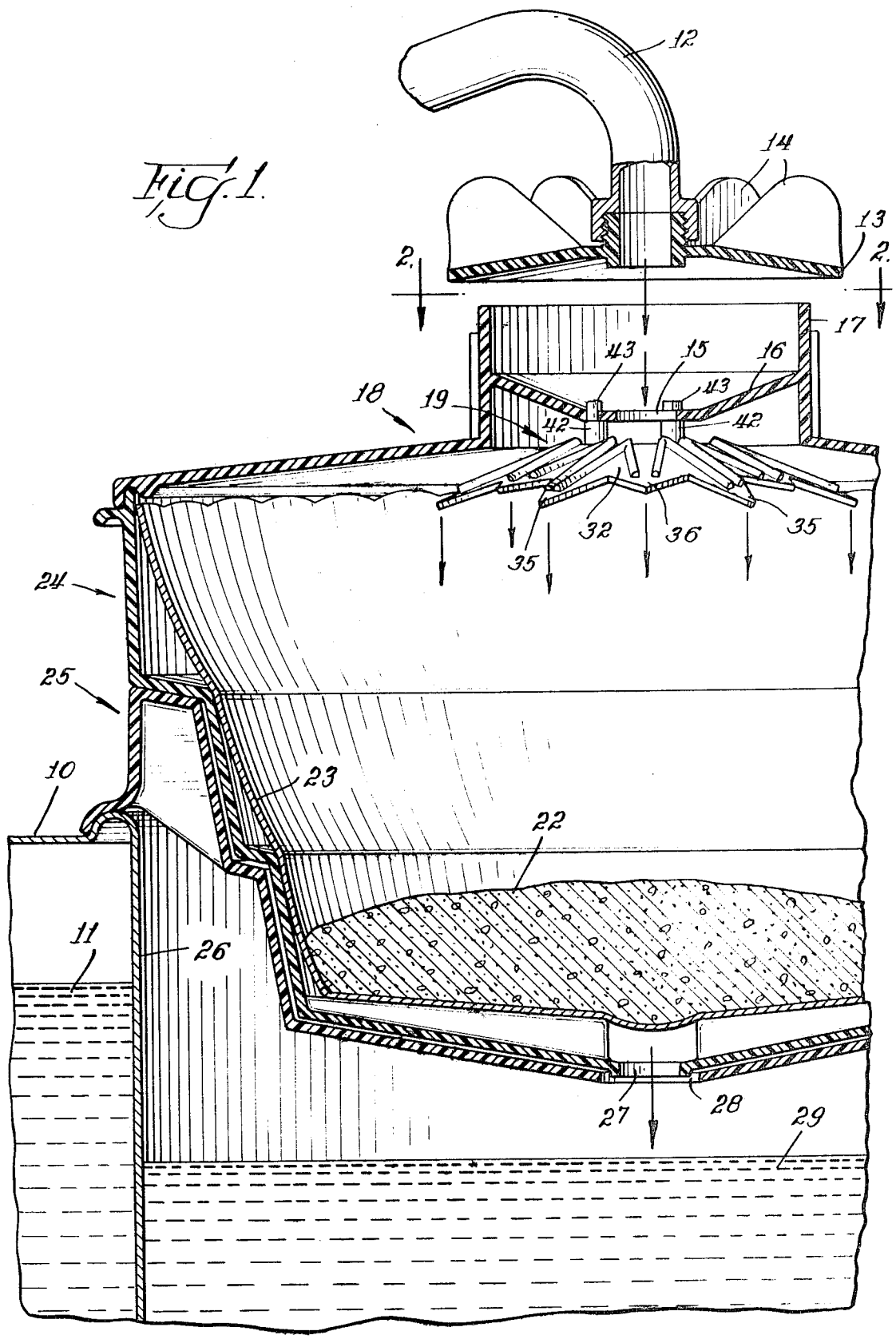
FIG. 1 is a view, partly in section and partly in side elevation of a portion of a coffee making machine provided with the spray head of the present invention.

Referring now to FIG. 1 there is illustrated here a portion of a coffee-making machine which is disclosed in sufficient detail to make clear the construction and operation of the present invention. The coffee-making machine includes a metallic tank 10 that is arranged to contain hot water 11 which is supplied by suitable means to a swing spout 12 for coffee making purposes. The swing spout 12 terminates in a sanitary cover 13 having upstanding flanges 14 to facilitate manipulation of the swing spout 12 from one operative position to another operative position. Hot water from the swing spout 12 is discharged downwardly as indicated by the arrows to flow through an opening 15 in a partition 16 which is molded integrally with a central cup-shaped formation 17 that forms an integral part of a plastic funnel cover which is indicated, generally, at 18. The hot water is distributed by a spray head, indicated generally at 19, which is a one-piece injection molded plastic member the details of construction of which will be set forth hereinafter.

The hot water is substantially uniformly distributed by the spray head 19 and flows downwardly as indicated by the arrows on to ground coffee 22 therebelow which is contained in a filter 23 which is located in a plastic funnel that is indicated, generally, at 24. The funnel 24 is positioned in a plastic cover 25 which overlies the upper end of a metallic coffee extract receptacle 26 which extends into the hot water 11 in the tank 10 and thereby is maintained at an elevated temperature. Coffee extract flows through the lower portion of the filter 23 and through an opening 27 in the lower central portion of the funnel 24 and an aligned opening 28 in the lower portion of the cover 25 into the receptacle 26 where the coffee extract is indicated at 29.

Figure 3:
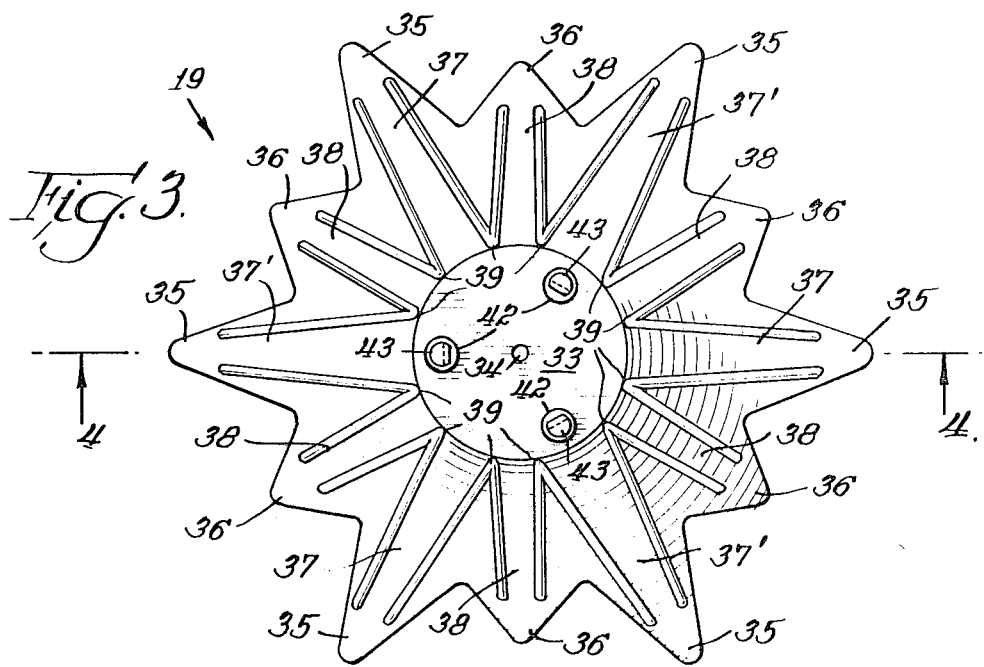
FIG. 3 is a top plan view of the spray head.
Figure 4:
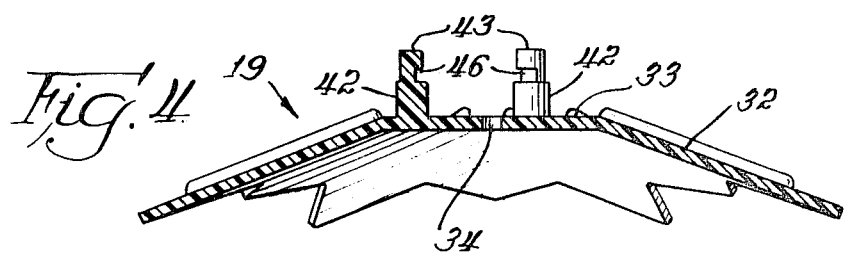
FIG. 4 is a vertical sectional view taken generally along line 4—4 of FIG. 3.

In FIGS. 3 and 4 the details of construction of the spray head 19 are shown more clearly. It will be noted from the cross sectional view, FIG. 4, that the spray head 19 is of frustoconical configuration and that it has an inclined surface 32 which is located at an angle of about 22° from the horizontal. Also there is a flat top surface 33 provided with a central aperture 34 through which a portion of the hot water flows downwardly and centrally of the spray head 19.

In order to effect a fairly uniform distribution of the hot water the periphery of the spray head 19 is serrated through the provision of relatively long serrations 35 alternating with relatively short serrations 36. Since the hot water flows principally from the tips of the serrations 35 and 36, it is desirable that they be of different lengths to ensure a more uniform distribution of the hot water in flowing on to the ground coffee 22.

The flow of hot water from the flat top surface 33 to which it is supplied from the swing spout 12 is directed to the tips of the serrations 35 and 36 by channels 37 and 37', which are aligned with the relatively long serrations 35 and by channels 38 which are aligned with the relatively short serrations 36. The provision of the channels 37, 37' and 38 ensures substantially uniform flow of hot water over the inclined surface 32 of the spray head 19 without requiring that it or the coffee making machine be leveled with a high degree of accuracy. Without the channels 37, 37' and 38, if the spray head 19 is not leveled accurately, there is a tendency for the hot water to concentrate over a small area of the inclined surface 32.

It will be observed that the channels 37, 37' and 38 are formed by inverted V-shaped ribs 39 that are molded integrally with inclined surface 32 of the spray head 19 and extend upwardly therefrom. The apex of each of the V-shaped ribs 39 is located along the periphery of the circular flat top surface 33 on to which the hot water is directed from the swing spout 12.

Figure 2:
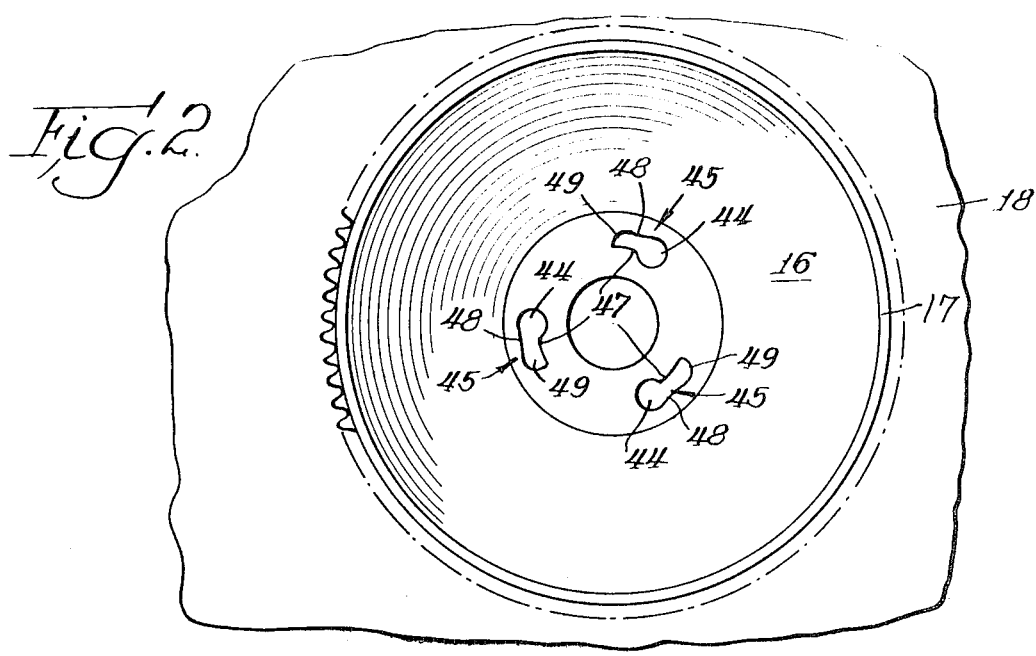
FIG. 2 is a top plan view of a portion of the plastic funnel cover shown in FIG. 1, the view being taken generally along line 2—2 of this FIG.

For will be supporting the spray head 19 on the under side of the partition 16 upstanding pins 42 are molded integrally with the spray head 19. The pins 42 have semicircular upper ends 43 that are arranged first to enter circular openings 44, FIG. 2, at one end of each of arcuate slots 45 which are formed in the partition 16. Shallow notches 46 are formed in the pins 42 below the semicircular upper ends 43. After insertion of the semicircular upper ends 43 of the pins 42 into the circular openings 44, the spray head 19 is pivoted so that the shallow notches 46 move past flanges 47 along the arcuate slots 45 and past detents 48 on the opposite sides into end portions 49 of the arcuate slots 45. In this position the spray head 19 is securely held. For removal it is pivoted in the opposite direction to bring the semicircular upper ends 43 into the circular openings 44. Thereafter the spray head 19 can be removed by permitting it to downwardly. It is important that provision be made for readily removing the spray head 19 in order that cleaning and inspection thereof can facilitated.

Attention is directed to the fact that the pins 42 are in alignment with the entrances to the channels 37'. Also it will be observed that these channels, and particularly the entrances thereto are slightly wider than the channels 37. The reason for this is to compensate for the presence of the pins 42 and thereby to ensure substantially uniform flow of hot water through the channels 37, 37' and 38.

What is claimed as new is:

1. Means for receiving hot water from above and distributing it over ground coffee therebelow comprising: a sprayhead adapted to receive said hot water centrally and having a downwardly inclined frustoconical surface over the periphery of which said hot water flows, said periphery being serrated to distribute said hot water at different distances from the center of said sprayhead, means providing channels on said downwardly inclined surface to direct said flow of hot water toward said serrated periphery, and the serrations being of different lengths and their tips being correspondingly located to effect distribution of said hot water over a relatively great area.

2. THe hot water receiving and distributing means according to claim 1 wherein alternate serrations are of equal length.

3. The hot water receiving and distributing means according to claim 1 wherein said channels are aligned with said tips.

4. The hot water receiving and distributing means according to claim 1 wherein said channels are formed by inverted V-shaped ribs integral with said inclined surface.

5. Means for receiving hot water from above and distributing it over ground coffee therebelow comprising a sprayhead adapted to receive said hot water centrally and having a downwardly inclined frustoconical surface over the periphery of which said hot water flows, said periphery being serrated to distribute said hot water at different distances from the center of said sprayhead, means providing channels on said downwardly inclined surface to direct said flow of hot water toward said serrated periphery, a plurality of support pins extending upwardly from the flat upper surface of said sprayhead in alignment with certain of said channels, and said certain channels each having a wider entrance than the remaining channels.

6. The hot water receiving and distributing means according to claim 5 wherein said flat upper surface is centrally apertured for the low of said hot water therethrough.

7. The hot water receiving and distributing means according to claim 5 wherein said channels are formed by inverted V-shaped ribs integral with said inclined surface.

* * * * *